United States Patent
Muller, deceased

[11] 3,806,272
[45] Apr. 23, 1974

[54] SPINDLE ARRANGEMENT FOR MACHINE TOOLS

[75] Inventor: Johann Muller, deceased, late of Unterhaching, Germany by Katharina Muller, legal representative

[73] Assignee: Friedrich Deckel Aktiengesellschaft, Munich, Germany

[22] Filed: Nov. 10, 1972

[21] Appl. No.: 305,436

[30] Foreign Application Priority Data
Nov. 11, 1971 Germany .................... 2156153

[52] U.S. Cl. .............. 408/239 A, 408/20, 90/11 D
[51] Int. Cl. ........................................ B23b 47/00
[58] Field of Search ...... 90/11 D, 11 A; 408/239 A, 408/126, 128, 135, 20

[56] References Cited
UNITED STATES PATENTS
2,883,889  4/1959  Diener ............................ 90/11 A
2,434,639  1/1948  Bugatti ........................... 90/11 A Primary Examiner—Gil Weidenfeld
Attorney, Agent, or Firm—Woodhams, Blanchard and Flynn

[57] ABSTRACT

A spindle arrangement for a machine tool includes a hollow working spindle provided with a taper socket for the reception of the shank of a tool and drive means for driving the working spindle. A hollow draw-in bar inside the spindle is operable for tightening and releasing the tool and a separate high-speed spindle is mounted in a bearing bush having an external taper identical with that of the taper shank of such tool. Thus, the bearing bush is adapted to be drawn into the working spindle by the draw-in bar for positioning the high-speed spindle at the tool end and coaxial with the working spindle. A separately drivable drive shaft is coaxially positioned within the hollow draw-in bar and the facing ends of the high-speed spindle and the drive shaft are coupled when the high-speed spindle is in position, so as to allow driving of the high-speed spindle.

8 Claims, 2 Drawing Figures

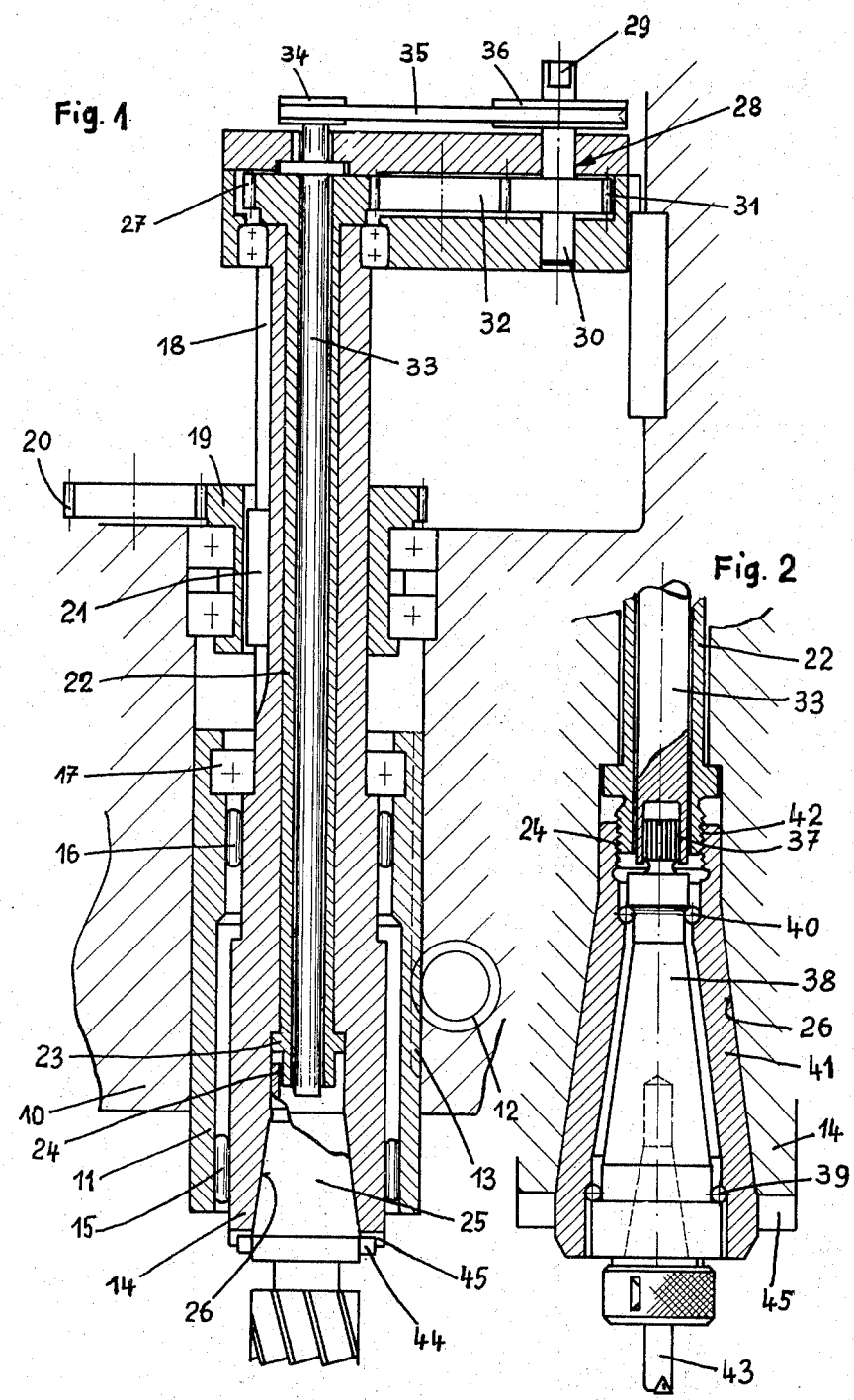

SPINDLE ARRANGEMENT FOR MACHINE TOOLS

The invention relates to a spindle arrangement for a machine tool, comprising a hollow working spindle containing a socket for the reception of a tool and a draw-in bar for tightening and releasing the tool, and a high-speed spindle which is independently drivable, and which is positionable at the tool end of and coaxially with the working spindle.

For certain machining purposes, particularly when using fine drilling or milling tools, it is desirable that the tool should have a speed which is substantially above the usual speed range of the working spindles of machine tools, for example with a view to producing good surface quality at economical rates of feed. It is not possible simply to drive the working spindle itself at the required high speed because the considerable diameter of the spindle and of its bearings would at such speeds introduce difficult problems in connection with bearings running hot, lubrication of bearings being ineffective, and oscillations as well as imbalance effects making themselves felt. This has led to the provision of a special high-speed spindle. Such a special high-speed spindle should, if possible, be coaxial with the working spindle firstly in order to avoid re-clamping of the workpiece when changing from one spindle to the other and secondly to avoid a loss of travel normal to the spindle axis as a result of such a change and an offset between the spindles.

Arrangements have already been proposed in which a high-speed spindle coaxially mounted with the working spindle is driven by the latter through a step-up gearing. However, the direct proximity of the gearing with the tool and the work gives rise to the risk of chatter and the generation of considerable heat which impairs machining precision. Moreover, because of the disposition of the gearing, design limitations impose themselves upon the choice of the diameter of the spindle and bearings, and this restricts the power that can be transmitted. Other drawbacks are due, particularly in the case of machine tools having an axially movable spindle, to the gearing at the end face of the spindle limiting freedom of movement in relation to the work and special structures which are capable of participating in the movements of the spindle being needed for supporting the gearing on the machine.

For horizontal boring and milling machines a spindle arrangement has been proposed which comprises a hollow working spindle containing a coaxially disposed draw-in bar or draw-in shaft which can be coupled to a high-speed spindle coaxially attached to the working spindle, and which can be driven at the speeds required of a high-speed spindle (published unexamined German Pat. specification No. 1,961,673).

A spindle bearing box is screwed to the face of the working spindle, whereas the end of the high-speed spindle projecting into the hollow working spindle is gripped by the draw-in shaft. During operation the working spindle must be locked and the draw-in shaft connected to the drive means by a coupling. At the same time the draw-in shaft is uncoupled from the chucking servo. It will be apparent that this arrangement is of unwieldy design and construction. Moreover, the principal drawback must be regarded as being that fitting and removal of the high-speed spindle and is most inconvenient and time-consuming.

It is the object of the present invention to provide a spindle arrangement comprising a working spindle and a high-speed spindle which is extremely precise in use besides being easy to fit and to dismantle quickly.

According to the invention there is provided a spindle arrangement for a machine tool, comprising a hollow working spindle provided with a taper socket for the reception of the shank of a tool, drive means for driving the working spindle, a hollow draw-in bar inside the spindle operable for tightening and releasing the tool, and a separate, high-speed spindle mounted in a bearing bush having an external taper identical with that of the taper shank of a tool whereby the bearing bush is adapted to be drawn into the working spindle by the draw-in bar for positioning the high-speed spindle at the tool end of and coaxial with the working spindle, and a separately drivable drive shaft coaxially positioned within the hollow draw-in bar, the facing ends of the high-speed spindle and the drive shaft being coupled when the high-speed spindle is in position for driving the high-speed spindle.

With the described arrangement the high-speed spindle can be easily and quickly inserted into the taper of the working spindle like an ordinary tool and tightened by the draw-in bar. The bearing bush, which contains bearings for the high-speed spindle, suitably has a standard external taper which ensures an unexceptionable fit and setting in the spindle. The design and location of the drive means for the high-speed spindle is arbitrarily selectable so that there is no impairment of machining precision such as unavoidable in prior arrangements.

In the case of milling machines it has already been proposed to mount a high-speed spindle in an adapter which fits into the taper of a working spindle and to drive such a spindle through the hollow interior of the working spindle (U.S. Pat. specification No. 2,434,639). However, the adapter itself is extended through the working spindle and threadedly secured at the input end of the spindle so that fitting and dismantling are complicated operations. A darw-in bar such as that provided in the type of machines with which the present invention is concerned is absent in this prior art spindle.

The draw-in bar has the sole purpose of pulling tools or the high-speed spindle tightly into the taper so that, whenever the high-speed spindle is to be used, the draw-in bar need not first be uncoupled from the chucking drive and be recoupled with the working drive, a circumstance which affords further simplifications with regard to operation and design.

According to a preferred feature of the invention the drive shaft is driven through transmission means from the main drive of the working spindle. By deriving the drive for the high-speed spindle from the main drive in this manner a special driving motor can therefore be saved. In principle it is nevertheless possible for the working spindle and the high-speed spindle to be continuously coupled to the main drive so that the operation of one spindle involves also rotating the other. This constitutes a very simple arrangement. However, the invention also permits one or both spindles to be uncoupled from the drive.

The draw-in bar may be axially movable or it may be a rotatable draw-in shaft provided with draw-in threads and operated by any desired actuating drive means such as a gear drive means. In the latter case the invention proposes operatively to connect a member of the gear means by transmission means, preferably a Vee-belt transmission, to the drive shaft of the high-speed spindle. The transmission train from the main drive of the machine to the high-speed spindle will then include the working spindle, the draw-in shaft which is connected to the working spindle for common rotation therewith by the bearing bush of the high-speed spindle, the actuating gear drive means of the draw-in shaft, and the Vee-belt transmission to the high-speed spindle. In this way the gear means that are substantially already present can be utilized for driving the high-speed spindle and a simple and economical form of construction is thus achieved.

A preferred embodiment of the present invention is shown by way of example in the accompanying drawing and will now be described in detail. In the drawings:

FIG. 1 shows a spindle arrangement comprising a draw-in shaft and a drive shaft for a high-speed spindle, in axial section, a standard milling tool being fixed in the spindle; and FIG. 2 is a larger scale representation of the tool-carrying end of the arrangement according to FIG. 1, showing a high-speed spindle in position.

The body 10 of a machine tool not further shown contains in conventional manner a spindle sleeve 11 which cannot rotate but which can be moved in the axial direction; such a movement is imparted to the sleeve by a pinion 12 meshing with rack teeth 13. A working spindle 14 is rotatably mounted inside the spindle sleeve 11 in radial bearings 15, 16 and thrust bearings 17. Outside the spindle sleeve the working spindle contains an external axial slot 18 which permits movement in relation to a gearwheel 19 mounted in fixed bearings in the body 10 of the machine tool. The gearwheel 19 is driven by a cooperating gearwheel 20 which may be part of a gear train operatively coupled to a main driving motor not shown in the drawings, and which imparts torque to the working spindle by a key 21 engaging the slot 18.

Rotatably mounted but axially fixed inside the working spindle 14 and coaxial therewith is a hollow draw-bar or draw-in bar 22. The tool end 23 of this draw-in bar is provided with threads 24 which permit the standard taper shank of a tool 25 to be drawn into the inside taper 26 of the spindle. The other end of the draw-in bar is formed with a gearwheel 27 which cooperates with draw-in gearing. This gearing which is generally indicated by reference numeral 28 comprises a shaft 30 which can be turned by hand, for example by a crank fitted on a squared end 29, the shaft transmitting its rotation to the draw-in bar through gearwheels 31 and 32.

Inside the hollow draw-in bar 22 is a rotatable, axially fixed drive shaft 33 for driving a high-speed spindle. At its upper end this drive shaft carries a Vee-belt pulley 34. This pulley is operatively connected by a Vee-belt to a second Vee-belt pulley 36 mounted on the drive shaft 30 of the draw-in gearing 28.

The tool end of the drive shaft 33, see FIG. 2, contains an axial bore which is splined in its interior at 37 for cooperation with corresponding external splines on the end of a high-speed spindle 38 fitted into the internal taper 26 of the working spindle 14, thereby to couple the shaft 33 and the spindle 38 for the transmission of torque. The high-speed spindle is rotatable in ball bearings 39 and 40 inside a bushing or bearing bush 41. Externally this bush has a standard taper which exactly fits the internal taper 26 of the working spindle 14. At its upper end the bush 41 is provided with internal threads 42 which are engaged by the external threads 24 on the end of the draw-in bar 22 and which firmly pull the bush into the spindle when the draw-bar is rotated. The high-speed spindle 33 carries a chuck for fitting a tool 43.

The described spindle arrangement functions as follows. When the working spindle 14 is used a tool 25 is fitted thereto, its taper shank being drawn into the inside taper 26 by the draw-in bar 22 (FIG. 1). In conventional manner the working spindle can be temporarily locked for this purpose. The draw-in bar is rotated by means of the gearing 28, causing the threads 24 to screw into the cooperating threads at the end of the taper shank of the tool and to draw the tool into the spindle taper. For rotatably locking the tool to the working spindle, keys 44 are formed on the taper shank of the tool and are received into corresponding recesses 45 in the spindle. The working spindle is driven by the gear wheels 20 and 19, as already described, and the axial slidability of the spindle in the gearwheel 19 also permits the spindle to be axially fed. When the spindle rotates the draw-in bar 22 participates in this rotation because it is coupled to the spindle by the tool. The gearwheel 27, the gear train 28 and the Vee-belt transmission 34, 35, 36 also impart rotation to the drive shaft 33 at a stepped-up speed. Naturally it would be possible for the gearwheel 32 to have the form of a shiftable pinion to permit the gearing and hence the drive shaft 33 to be uncoupled from the working spindle. Since such a device is known in the art it requires no special description in the present context.

When it is desired to use the high-speed spindle the bearing bush 41 containing the high-speed spindle 38 is fitted into the spindle taper in the same way as a tool 25 (FIG. 2). A rotational lock between the bearing bush 41 and the working spindle is not normally necessary because of the smaller torques transmitted by high-speed spindles, but in the same way as described for the tool 25 the provision of such locking means comprising keys on the bearing bush 41 engaging the recesses 45 would naturally also be possible. The high-speed spindle is driven in the manner already described by the transmission of drive through the gearwheels 20, 19, the working spindle 14, the bearing bush 41 firmly fixed in the spindle, the draw-in bar 22 threadedly attached to the bush and the gear train to the high-speed spindle 38. The threaded connection between the draw-in bar 22 and bush 41 tends to tighten, rather than loosen, as it transmits torque to drive the high-speed spindle 38. This transmission steps up the speed from that of the working spindle to the higher speed of the driving spindle by virtue of the transmission ratio of the Vee-belt drive. The speed change gears available for the working spindle can naturally also be used for changing the speed of the high-speed spindle.

Axial feed of the high-speed is simply effected by feeding the working spindle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A spindle assembly for a machine tool comprising of a hollow working spindle, a tool holder, said hollow receiving the tool holder, a hollow drawbar rotatably supported inside said hollow spindle for securing and releasing the tool holder; and said tool holder including a tapered bushing being complementary to said tapered socket, a high-speed spindle rotatably mounted in said bushing and substantially coaxial with the working spindle, means for securing a cutting tool in said high-speed spindle, a drive shaft rotatably mounted in said hollow drawbar and coaxial therewith, means for coupling said drive shaft with the high-speed spindle, whereby the high-speed spindle can be rotated at a faster speed than the working spindle.

2. A spindle arrangement according to claim 1, wherein the drive shaft is driven through a transmission means from a drive means for the working spindle.

3. A spindle arrangement according to claim 1, comprising gear means for rotating the drawbar for operating the drawbar, and transmission means operatively connecting a member in said gear means to the drive shaft for driving the high-speed spindle.

4. A spindle arrangement according to claim 2, wherein the transmission means is a Vee-belt transmission.

5. A spindle arrangement according to claim 1, wherein the drive shaft has a bore containing internal splines for coupling the same to complementary external splines on the high-speed spindle.

6. A spindle arrangement according to claim 1, wherein the bushing is provided with projecting keys which are received into corresponding recesses in the end face of working spindle for rotatably locking the bearing bush to the working spindle.

7. A spindle arrangement according to claim 1, wherein the working spindle, the drawbar and the drive shaft are mounted in a spindle sleeve in which they are conjointly axially movable.

8. A spindle arrangement according to claim 1, including operating means for the drawbar and drive means for the drive shaft, wherein the operating means for the drawbar and the drive means for the drive shaft are axially feedable together with the working spindle and are nonrotatable therewith and means for driving the working spindle including a pinion slidably mounted on the working spindle and connected thereto by splines.

* * * * *